UNITED STATES PATENT OFFICE.

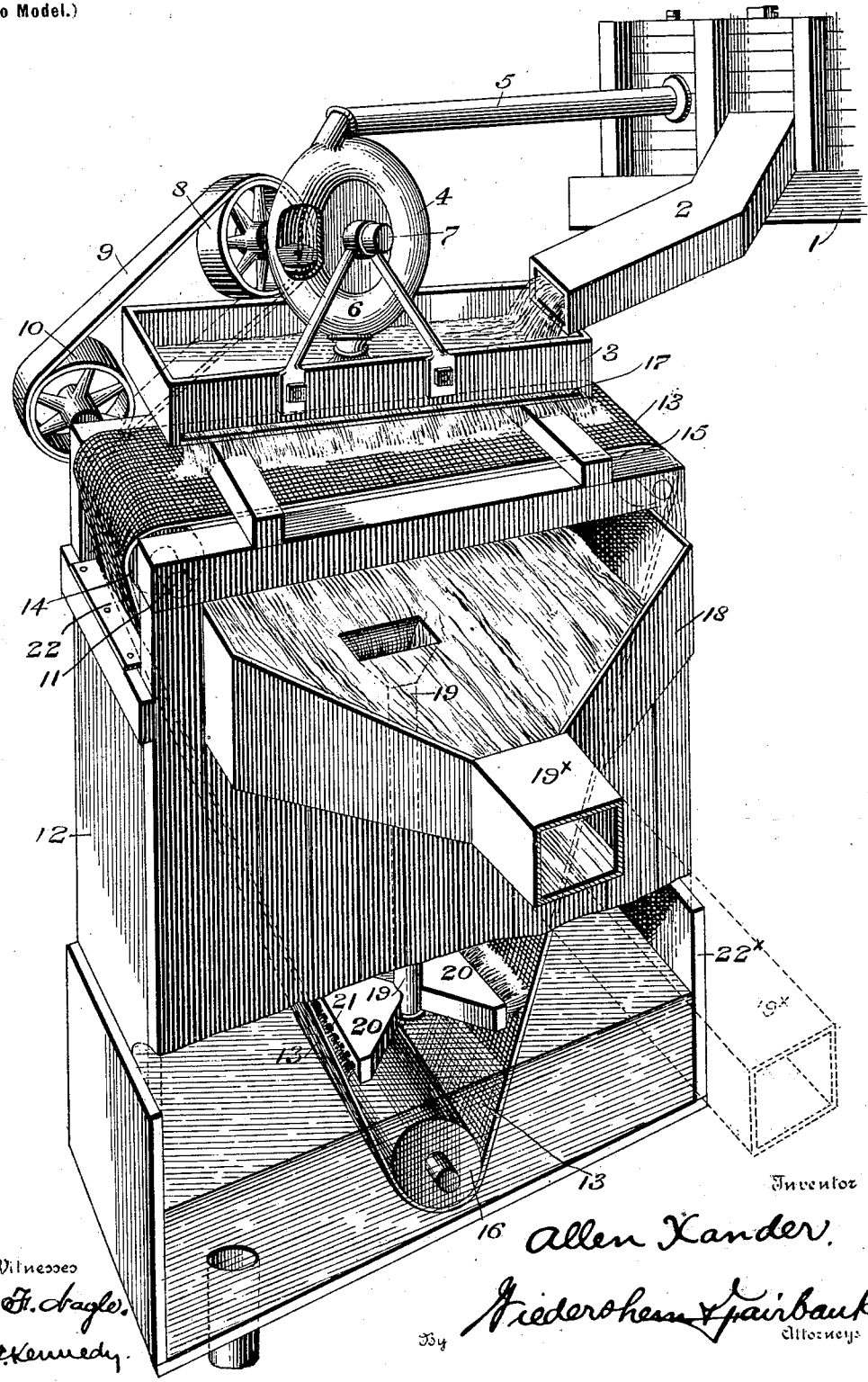

ALLEN XANDER, OF LOCKHAVEN, PENNSYLVANIA, ASSIGNOR OF ONE-HALF TO GEORGE W. SCHULTZ, OF PHILADELPHIA, PENNSYLVANIA.

SCREEN WATER-FILTER.

SPECIFICATION forming part of Letters Patent No. 671,683, dated April 9, 1901.

Application filed April 7, 1900. Serial No. 11,928. (No model.)

*To all whom it may concern:*

Be it known that I, ALLEN XANDER, a citizen of the United States, residing at Lockhaven, in the county of Clinton, State of Pennsylvania, have invented a new and useful Improvement in Screen Water-Filters, which improvement is fully set forth in the following specification and accompanying drawing.

My invention consists of an improved construction of water-filter wherein the head of the unfiltered water is employed to actuate a suitable screen or endless apron made of canvas, wool, wire, or other porous material, the movement of the apron being simultaneously effected with the filtering by the flow of the unfiltered water.

It also consists of a novel means for utilizing part of the filtered water for cleaning the inner surface of the endless apron, the other or outer surface thereof being cleaned by suitable scrapers or other devices.

It also consists of a novel manner of supporting rollers over which the endless apron or screen passes, said rollers being so arranged as to give to the apron the outlines of a triangle having its apex in the lower portion of the filter.

It also consists in the provision of a bed of purified water, in which the lower roller and the lower portion of the triangular-shaped apron revolve.

It also consists of novel means for withdrawing the filtered water and for simultaneously using a portion of the latter for cleaning purposes.

It further consists of novel details of construction, all as will be hereinafter fully set forth, and particularly pointed out in the claims.

The figure represents a perspective view of a screen water-filter embodying my invention.

Referring to the drawing, 1 designates a reservoir or source of water-supply, having the race 2 leading therefrom to the pan 3, upon which is supported the motor 4 in any suitable manner, water being conducted to said motor through the pipe 5 and exhausting therefrom through the pipe 6 into said pan.

7 designates a shaft actuated by the motor and carrying thereon the pulley 8, from which power is transmitted by the belt 9 to the pulley 10, which is mounted on the shaft 11, which is journaled in the framework or housing 12.

13 designates an endless apron which passes around the roller 14, mounted on the shaft 11, and also around the rollers 15 and 16, which are journaled in suitable bearings, it being noted that the rollers 14, 15, and 16 are arranged so that the apron 13 passes over them in the form of a triangle, the apex of the latter being the roller 16, which is located in the tank $22^\times$, which is continually filled with filtered or purified water, as will be explained.

The water passes from the pan 3 through the outlet 17 and flows upon the adjacent portion of the apron 13 and after passing therethrough escapes in a filtered and purified condition into the discharge-pan 18 and through the conduit $19^\times$ to the desired point. A portion of the filtered water passes downwardly from the pan 18 through the pipe 19 to the heads 20, which discharge filtered or purified water through the ports 21 against the inner surfaces of the apron, the outer surface of the latter being cleaned by the scrapers 22, which are preferably located on either side of the apron.

The operation is as follows: The water flowing through the pipe 5 actuates the motor and by reason of the intermediate connections imparts rotation to the roll 14 and to the endless apron carried thereby. The unfiltered water flows from the pan 3 upon the endless apron or belt 13, through which it percolates, leaving the solid substances behind, which are carried away over the rollers and scraped off from the apron by means of the side scrapers 22, the belt or apron being further cleaned on its inner surface by passing through the purified water in the bottom of the box or chamber 22 and being also cleaned by the spray discharged upon its inner surface from the perforated heads 20.

It will be seen from the foregoing that the conduit or outlet $19^\times$ can convey the filtered water thus cleaned of leaves, scum, sticks, or dirt to sand filters, settling-beds, or such other point of use as may be expedient.

It will be evident that my novel apparatus above described can be used in conjunction with various forms of filter-beds or reservoir-filters, and when the water in the lower chamber $22^\times$ becomes dirty for any cause it can be withdrawn by a blow-off pipe at the bottom of the same.

It will be apparent that changes may be made by those skilled in the art which will come within the scope of my invention, and I do not therefore desire to be limited in every instance to the exact construction I have herein shown and described.

Having thus described my invention, what I claim as new, and desire to secure by Letters Patent, is—

1. In a filter, an endless apron or screen, means for actuating said apron, means for discharging unfiltered water upon said apron, means for withdrawing the filtered water, and a tank in the lower portion of the filter for the reception of filtered water, through which latter said apron travels.

2. In a filter, a reservoir, a pipe leading therefrom to a filtering-apron, a motor, a pipe leading from said reservoir to said motor, means for actuating said apron by said motor, means for cleaning the interior surface of said apron by discharging filtered water thereupon, and a tank in the lower portion of the filter for the reception of filtered water through which latter said apron travels.

3. In a filter, a movable filtering-apron, rollers around which said apron travels, said rollers being arranged in triangular order, whereby said apron assumes the form of a triangle having its apex at its lower portion, cleaning devices located interiorly of said apron and near said apex, and means for actuating said rollers and apron.

4. In a filter, a movable filtering-apron, rollers around which said apron travels, said rollers being arranged in triangular order, means for actuating said rollers and apron, means for cleaning the interior of said apron by discharging filtered water thereon, and a tank in the lower portion of the filter for the reception of filtered water, through which latter said apron travels.

5. In a filter, a movable filtering-apron, rollers around which said apron travels, said rollers being arranged in triangular order, a tank in the lower portion of the filter for the reception of filtered water, through which latter said apron travels, means for cleaning the interior surface of said apron by discharging filtered water thereon and scrapers for cleaning the exterior surface of said apron.

6. In a filter, a water-motor, a movable filtering-apron, rollers around which said apron travels, said rollers being arranged in triangular order, means for actuating said rollers and apron, means for cleaning the interior surface of said apron by discharging filtered water thereupon, a tank in the lower portion of said filter for the reception of filtered water in which latter the lower portion of said apron travels and an outlet for the discharge of the filtered water.

7. The combination of a reservoir, a pan for the reception of unfiltered water, a water-motor supported upon said pan, a filtering-apron, rollers around which said apron passes, said rollers being arranged in triangular order, the apex of the triangle being in the lower portion of the filter, connecting devices intermediate said motor and apron, whereby the operation of the latter is effected, a discharge-outlet from said pan upon said apron, means for withdrawing the filtered and purified water, and a pipe for directing a portion of the filtered water so as to discharge upon the inner surface of said apron.

8. The combination of a reservoir, a pan for the reception of unfiltered water, a water-motor supported upon said pan, a filtering-apron, rollers around which said apron passes, said rollers being arranged in triangular order, the apex of the triangle being in the lower portion of the filter, connecting devices intermediate said motor and apron, whereby the operation of the latter is effected, a discharge-outlet from said pan upon said apron, means for withdrawing the filtered and purified water, a pipe for directing a portion of the filtered water so as to discharge upon the inner surface of said apron, and scrapers for cleaning the outer surface of said apron.

9. The combination of a filtering-apron, means for directing unfiltered water thereupon, means for cleaning the inner and outer surfaces of said apron, and a tank in said filter for the reception of filtered water, through which latter said apron travels.

10. The combination of a filtering apron or screen of triangular contour, means for directing unfiltered water thereon, means for actuating said apron, and a tank in the lower portion of the filter, for the reception of filtered water through which latter said apron travels.

11. The combination of a filtering apron or screen of triangular contour, means for directing unfiltered water thereon, a motor for actuating said apron, the exhaust from said motor discharging on said apron, and means for cleaning the inner and outer surfaces of said apron.

12. The combination of a filtering apron or screen, means for directing unfiltered water thereupon, means for actuating said apron, a tank in said filter for the reception of filtered water, through which latter said apron travels.

13. The combination of a filtering apron or screen, means for directing unfiltered water thereon and a motor for actuating said apron, the exhaust from said motor discharging upon said apron.

14. The combination of a filtering apron or screen, means for directing unfiltered water thereon, a motor for actuating said apron, means for directing the exhaust from said motor upon said apron, and a tank for the reception of filtered water, through which latter said apron travels.

ALLEN XANDER.

Witnesses:
GEO. A. BROWN,
KATHRYN FUREY.